United States Patent
Sun et al.

(10) Patent No.: US 11,379,293 B1
(45) Date of Patent: Jul. 5, 2022

(54) SYSTEM AND METHOD FOR AUTOMATICALLY MONITORING AND DIAGNOSING USER EXPERIENCE PROBLEMS

(71) Applicant: STATE FARM MUTUAL AUTOMOBILE INSURANCE COMPANY, Bloomington, IL (US)

(72) Inventors: Si Sun, Roswell, GA (US); Forrestt Severtson, Alpharetta, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 63 days.

(21) Appl. No.: 16/874,415

(22) Filed: May 14, 2020

(51) Int. Cl.
- *G06F 11/00* (2006.01)
- *G06F 11/07* (2006.01)
- *G06N 5/04* (2006.01)
- *G06N 20/00* (2019.01)

(52) U.S. Cl.
CPC ........ *G06F 11/079* (2013.01); *G06F 11/0751* (2013.01); *G06F 11/0778* (2013.01); *G06N 5/04* (2013.01); *G06N 20/00* (2019.01)

(58) Field of Classification Search
CPC .............. G06F 11/079; G06F 11/0751; G06F 11/0778; G06N 20/00; G06N 5/04
See application file for complete search history.

(56) References Cited

U.S. PATENT DOCUMENTS

| | | | |
|---|---|---|---|
| 11,244,340 B1* | 2/2022 | Morin | G06Q 30/0224 |
| 2015/0186938 A1* | 7/2015 | Zhang | G06Q 30/0256 |
| | | | 705/14.54 |
| 2016/0350173 A1* | 12/2016 | Ahad | G06F 11/0751 |
| 2017/0293691 A1* | 10/2017 | Zitouni | G06N 20/00 |
| 2020/0019420 A1* | 1/2020 | Saimani | G06Q 40/123 |
| 2020/0134388 A1* | 4/2020 | Rohde | G06N 20/00 |
| 2021/0019213 A1* | 1/2021 | Mestres | G06F 11/008 |
| 2021/0035235 A1* | 2/2021 | Zawadzki | G06N 5/045 |
| 2021/0173760 A1* | 6/2021 | Downie | G06F 11/3664 |
| 2021/0255914 A1* | 8/2021 | Ciabarra, Jr. | G06F 11/079 |

* cited by examiner

*Primary Examiner* — Jonathan D Gibson
(74) *Attorney, Agent, or Firm* — Marshall, Gerstein & Borun LLP

(57) ABSTRACT

The following relates generally to diagnosing problems with websites. In some embodiments, a webpage interaction processor receives a list of potential user experience problems. The webpage interaction processor then extracts click data from the website, and processes the extracted click data into grams. Subsequently, an analytics engine is trained based on the processed click data. The trained analytics engine may then diagnose the problem of the website with a potential user experience problem from the received list of potential user experience problems. In some embodiments, the process is entirely automated.

17 Claims, 7 Drawing Sheets

SYSTEM AND METHOD FOR AUTOMATICALLY MONITORING AND DIAGNOSING USER EXPERIENCE PROBLEMS

BACKGROUND

Current systems for identifying and remedying problems with websites are inefficient, and require many hours of human labor. For example, in some current web site diagnostic techniques, after a user interacts with a website, the user may be sent a survey in which the customer identifies a problem with the website. However, the customer may not be able to accurately describe the problem with the website, or may not take the time to completely fill out the survey. Indeed, the customer may never even bother to fill out the survey to identify the problem after interacting with the website. Even after the survey data is collected, current techniques of analyzing the survey data are very slow.

The systems and methods disclosed herein provide solutions to these problems and others.

SUMMARY

In one aspect, there is a computer-implemented method for diagnosing a problem of a website, the website comprising a plurality of webpages, and the method comprising, via one or more processors: receiving a list of potential user experience problems; extracting click data from the website; processing the extracted click data; training an analytics engine based on the processed click data; and using the trained analytics engine to diagnose the problem of the website with a potential user experience problem of the received list of potential user experience problems. The method may also remedy the problem.

In another aspect, there is a system for diagnosing a problem of a website, the website comprising a plurality of webpages, and the system comprising one or more processors configured to: receive a list of potential user experience problems; extract click data from the website; process the extracted click data; train an analytics engine based on the processed click data; and use the trained analytics engine to diagnose the problem of the website with a potential user experience problem of the received list of potential user experience problems.

In yet another aspect, there is a computer-implemented method for diagnosing a problem of a website, the website comprising a plurality of webpages, and the method comprising, via one or more processors: with a webpage interaction processor, receiving a list of potential user experience problems; with the webpage interaction processor, extracting click data from the website; with the webpage interaction processor, processing the extracted click data; training an analytics engine based on the processed click data; and with the trained analytics engine, diagnosing the problem of the website with a potential user experience problem of the received list of potential user experience problems.

Advantageously, the systems and methods disclosed herein may identify hidden problems, reduce research turnaround time, and alleviate time and resource constraints for research and analytics.

Further advantageously, compared to previously known processes, the systems and methods disclosed herein may:

Increase discoverability of previously hidden problems by automatically monitoring click streams and producing alerts;

Reduce the time spent traversing irrelevant components by pointing to rough causes of the problem;

Greatly reduce set-selection bias in study participants by using data from everyone who visits a website; and More objectively reflect a customer's behavior because the customer is in her natural environment without the direct presence of a researcher.

In addition, some contributions and innovative elements are of the following disclosure are: (a) methods to process user behavior data according to knowledge into features that can be used in algorithms to generate a diagnosis; (b) methods to determine standards (e.g., thresholds) for surfacing problems as alerts on the fly; and (c) methods to generate diagnosis (e.g., identify sources of the problems) on the fly.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

The present embodiments relate to, inter alia, diagnosing problems with websites.

By way of brief overview, some embodiments use clickstream data (e.g., click data of a series of webpages visited) to diagnose usability problems with websites. Some examples of diagnosed problems include that: a customer is unable to locate information relevant to a particular problem; a customer is unable to complete a process; the text of a setting is confusing; the positioning of web elements is counter-intuitive; the coloring of a link makes it look non-interactive; and a button on the website does not seem to be noticeable to a customer. It should be understood that these are only illustrative examples, and the techniques described herein diagnose many additional types of problems. In addition, some embodiments automatically identify hidden problems, reduce research turnaround time, and alleviate time and resource constraints for research and analytics.

To further explain, with many websites, it is relatively easy to diagnose technical issues; yet, user experience problems often go unnoticed until researchers and analysts catch those through conducting customer surveys, monitoring web traffic, and/or lab-based user experience research, which are costly and time consuming. As will become apparent upon reading the disclosure, the systems and methods improve on the currently known techniques. For example, automated diagnostic models described herein that use click behavior to predict user experience are able to provide unique benefits to a company's design, research, and analytics departments, requiring less time spent on repetitive low impact work.

Figure 1:
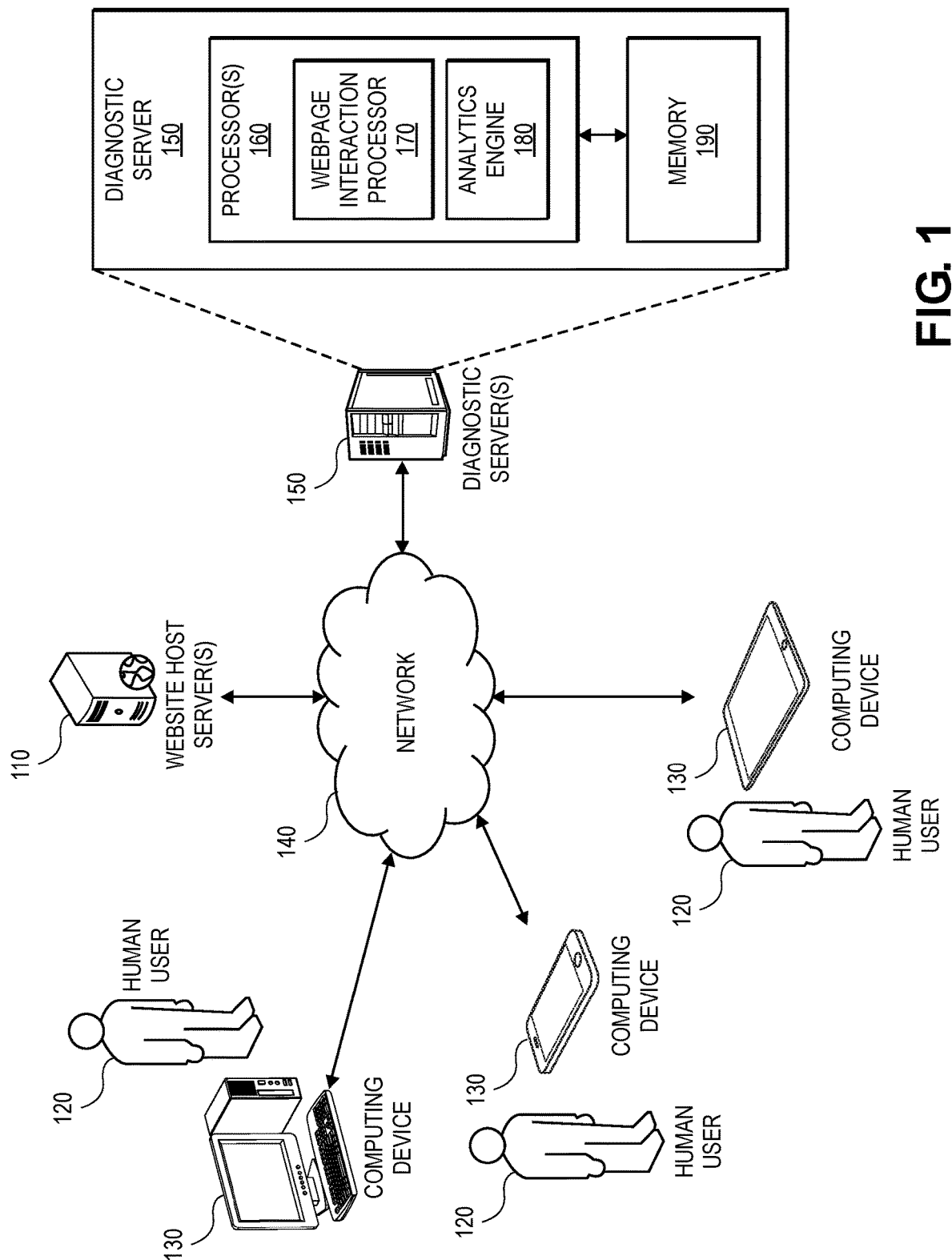
FIG. 1 shows an overview of an example system.

FIG. 1 shows an example embodiment of the systems and methods disclosed herein. With reference thereto, website host server 110 may host a webpage. The website host server 110 may belong to a company, a human individual, or any other entity. A human user 120 may use computing device 130 to access a web page hosted by the webpage host server 110 through network 140. It should be understood that the computing device 130 may be any computing device that can access a web page (e.g., a personal computer, a smart phone, a tablet, and so forth).

With further reference to FIG. 1, diagnostic server 150 is connected to the network 140 and monitors traffic of the webpage hosted by the website host server 110. In the example of FIG. 1, diagnostic server 150 and website host server 110 are illustrated as separate server(s); however, in some embodiments, the diagnostic server 150 and the website host server 110 may be the same server or group of servers. It should further be understood that the term server as used herein may mean a single server or a group of servers. As is understood in the art, each server(s) includes processor(s) and memory. In the example of FIG. 1, the diagnostic server 150 includes processor 160 (which includes webpage interaction processor 170 and analytics engine 180, as described below) and memory 190. As is understood in the art, the processor 160 may be a single processor or as a group of processors. Furthermore, the webpage interaction processor 170 and the analytics engine 180 may be implemented together on a single processor or group of processors, or implanted each on their own processor.

In some implementations, the system includes the following two components:
  (1) Webpage interaction processor 170: A processor that transforms webpage interactions into various input formats for corresponding data models.
  (2) Analytics engine 180: A processor that takes inputs from the webpage interaction processor, task success/failure data, or user experience data, and then outputs parameters for trained data models that depict the relationship between the inputs. The analytics engine's initial state is untrained data model(s).

In some embodiments, the system automatically diagnoses the presence of user experience-related issues. A diagnosis is established based on manually generated research knowledge and will improve as the knowledge improves. The algorithms to generate a diagnosis can be rule-based or learned, and can become less or more sophisticated based on need.

Figure 2:
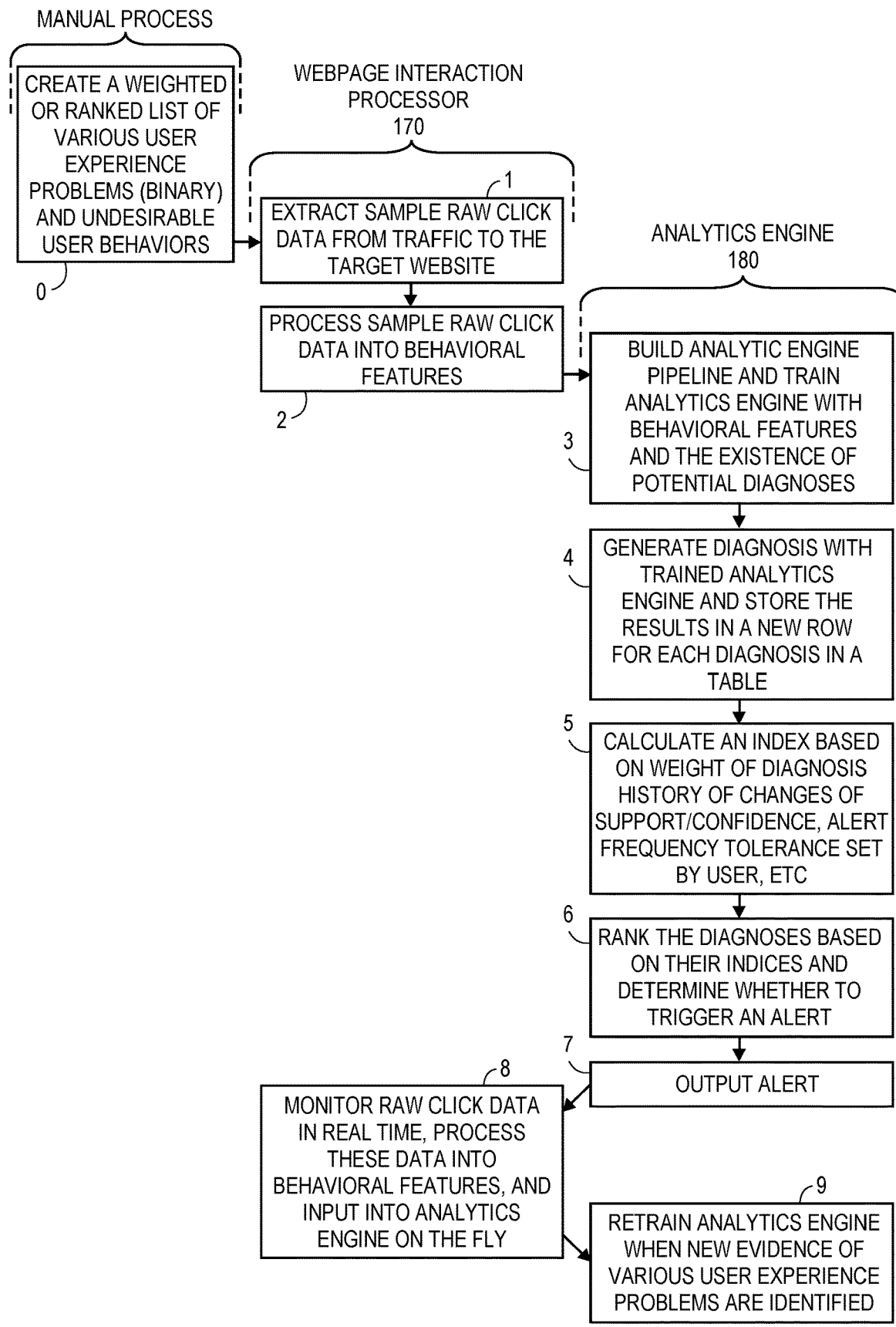
FIG. 2 shows a flowchart of an example embodiment overview.

FIG. 2 shows a flowchart of an example embodiment overview. In this example overview, at step 0, a human user creates a weighted or ranked list of various user experience problems (binary) and undesirable user behaviors (e.g., abandon session, failure to complete task, etc.). This is a list of potential diagnoses that the system will use.

At step 1, the webpage interaction processor 170 extracts sample raw click data from traffic to the target website.

At step 2, the webpage interaction processor 170 processes sample raw click data (e.g., data of webpages visited) into behavioral features. For example, the webpage interaction processor may process the data into grams. As used herein, a gram may refer to a sequence of webpages visited (e.g., a 3-gram may refer to a sequence of three visited webpages); in this respect, this terminology is "borrowed" from the fields of text recognition and speech recognition, in which an n-gram may refer to a sequence of n items in text or speech.

Examples of methods involved include n-grams (continuous), n-grams (same sentence), bag of URLs, reverse n-grams, cross-session n-grams, shortest paths, interruption n-grams, URL tf-idf (term frequency-inverse document frequency), etc. The terminology of the names of these example methods is also borrowed from the fields of text recognition and speech recognition; but, the processing methods disclosed herein are different than that what is known in the fields of text recognition and speech recognition.

The following will describe various examples of different types of grams.

Continuous n-grams: A moving window of a size of n on a continuous sequence of webpages that transcend multiple sessions. For example, a 1-gram may be each individual webpage; and a 2-gram may be a sequence of 2 webpages. In a further example of a 2-gram, assume there is a click sequence of ABCD, with ABCD representing 4 webpages, this click sequence has three 2-grams, including AB, BC, and CD.

Same sentence n-grams: A moving window of a size of n on a continuous sequence of webpages that treats each session independently.

Bag of URLs: This gram is used to calculate the frequency that each webpage appear and ignore the sequence.

Reverse n-gram: A pattern matching technique that counts how frequently the reverse sequence of an n-gram appears.

Cross-session n-grams: A pattern matching technique that counts how frequently n-grams occur across multiple sessions from the same user.

Shortest paths: The deviation of the sequence of webpages that the user traversed from the shortest path (or "happy path", which is often used in the user experience design domain).

Interruption n-grams: An n-gram concept that tracks interruption click sequences. An interruption is detected when the webpage that the user lands on is not a part of the company's website or not a part of the intended click process. The interruption n-gram may consider the whole interruption as a 1-gram or track certain elements of the interruption the same way as the regular n-gram does (e.g., track whether the link is public or a part of the deep web).

URL term frequency-inverse document frequency (tf-idf): This concept can apply to all types of n-grams. It is a calculation of a parameter that increases as the n-gram's frequency increases within a click sequence of one user and decreases as the n-gram's frequency increases across click sequences of multiple users.

At step 3, the analytics engine 180 builds an analytic engine pipeline and trains analytics engine with behavioral features and the existence of potential diagnoses.

At step 4, the analytics engine 180 generates diagnosis or diagnoses with trained analytics engine and store(s) the results in a new row for each diagnosis in a table. In addition, the system outputs a score for each process or element of the process that is being diagnosed.

At step 5, the analytics engine 180 calculates an index based on weight of diagnosis history of changes of support/confidence, alert frequency tolerance set by user, etc. It should be noted that the weight of diagnosis history of changes of support/confidence aspect is optional. For instance, a human user may wish to influence the indexing process, and would be one point where the human user could manually inject their influence on the indexing process. Human judgment may include their past experience, expert knowledge, or input from other systems. Alternatively, step 5 can be fully automatic, with the system calculating the index based on scoring techniques (e.g., support score only, confidence score only, support score multiplied with confidence score, etc.).

In some embodiments, the output of step 5 is a list of webpages, webpage elements, or processes with a score attached to each of them.

At step 6, the analytics engine 180 ranks the diagnoses based on their indices and determine whether to trigger an alert. For instance, as mentioned above, at step 4, the system outputs a score for each process or element of the process that is being diagnosed. But, there is a threshold for generating an alert to report a user experience problem. This threshold may be automatically determined in an out-of-box solution (e.g., generate 1 alert every day reporting the problem with the highest score) or manually determined in a customized case (e.g., only report problems with a score of 0.8 or higher).

At step 7, the analytics engine 180 outputs an alert. In some embodiments, the alert is audio, visual, and/or haptic. In some embodiments, there is a textual output to, for instance, a log file.

At step 8, the webpage interaction processor 170 monitors raw click data in real time, processes these data into behavioral features, and inputs the processed data into the analytics engine on the fly.

At step 9, the analytics engine 180 is retrained when new evidence of various user experience problems are identified.

Figure 3A:
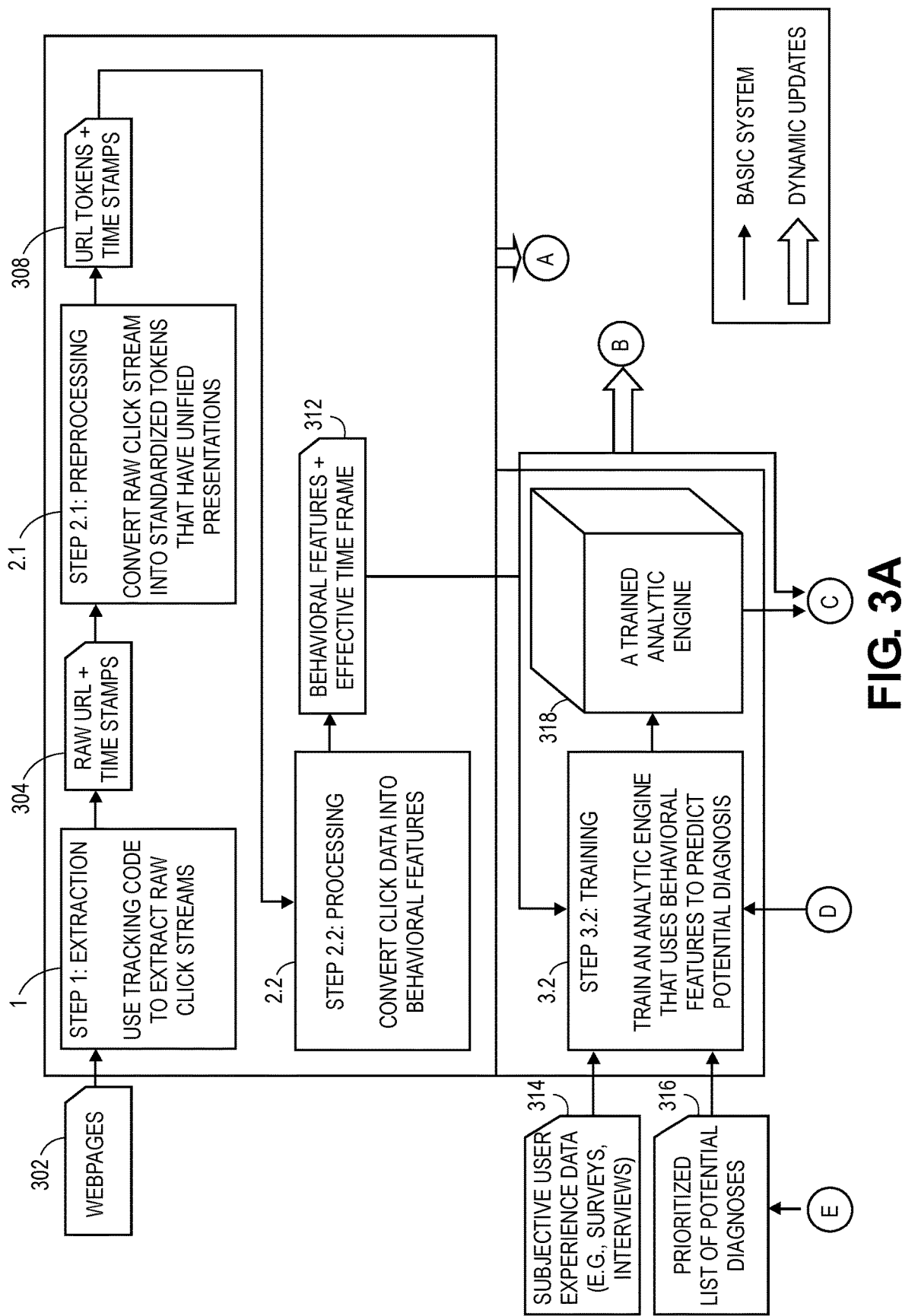
FIGS. 3A and 3B show a more detailed flowchart of an example embodiment.
Figure 3B:
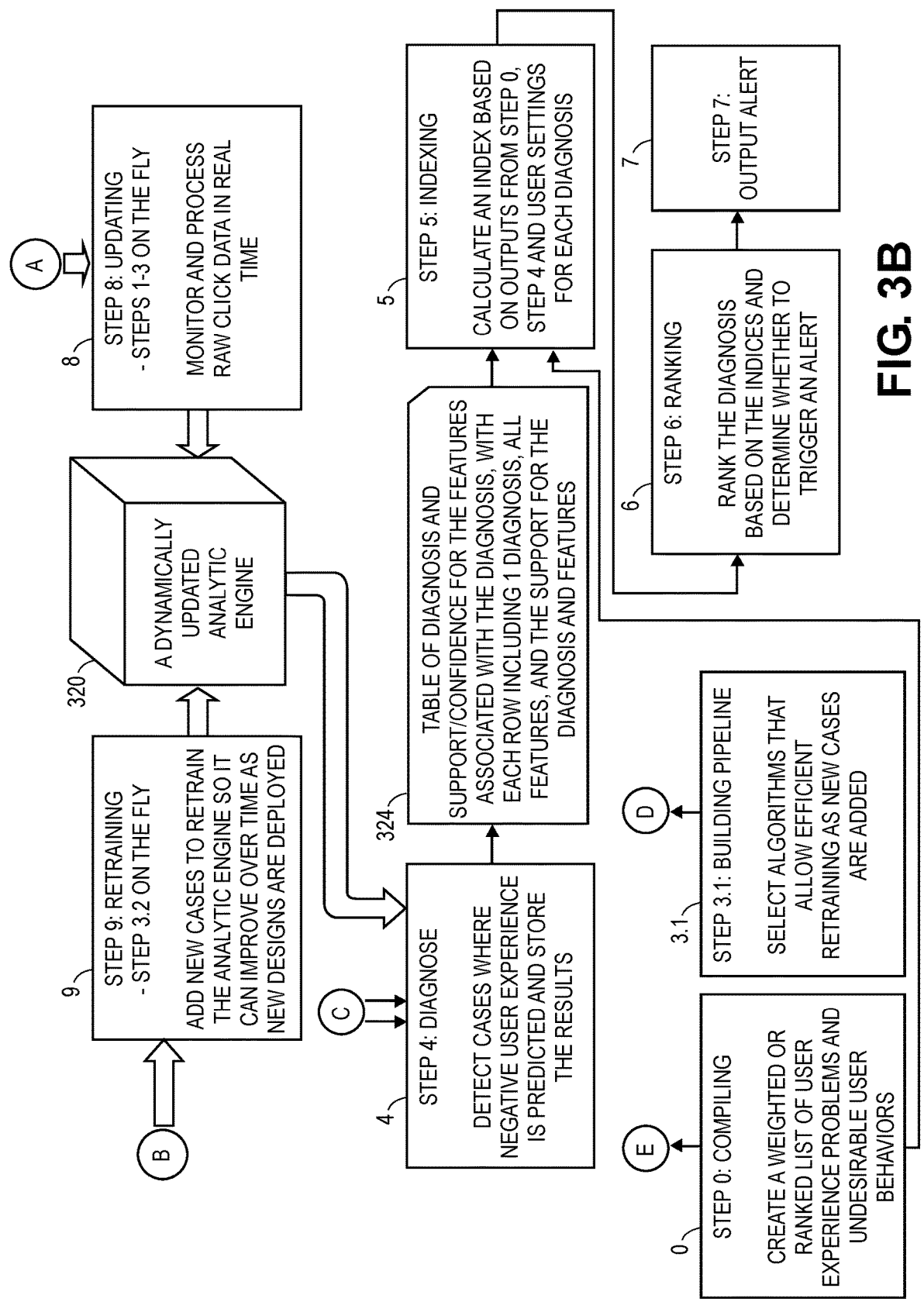

FIGS. 3A and 3B show a more detailed example embodiment. With reference thereto, at step 1, tracking code is used to extract raw click streams from webpages 302, which generates raw URL and timestamps 304. Then, at step 2.1, a raw click stream is converted into standardized tokens that have unified presentations. Next, at step 2.2, the URL tokens 308 are converted to behavioral features 312. The behavioral features 312, along with subjective user experience data 314 (e.g., surveys, interviews, and so forth) and a prioritized list of potential diagnoses 316 (created, e.g., manually, at step 0), are used to train an analytics engine at step 3.2.

Thus, step 3.2 creates the trained analytics engine 318, which may be used to predict potential diagnosis of webpages 302. The training may further be accomplished by building a pipeline by selecting algorithms that allow efficient retraining as new cases are added. Moreover, the trained analytic engine 318 may be dynamically updated at step 9. The dynamic retraining may be accomplished by adding new cases and/or data. This produces a dynamically updated analytic engine 320. Additionally, at step 8, raw click data is monitored and processed in real time which may further contribute to the production of the dynamically updated analytic engine 320.

The trained analytic engine 318 may be used to diagnose problems with websites (e.g., detect cases where negative user experience is predicted and store the results) at step 4. This creates table of diagnosis 324, which, in some embodiments, includes support and/or confidence for the features associated with the diagnosis. In some embodiments, each row of the table of diagnosis 324 includes one diagnosis, all features, and support for the diagnosis and features.

At step 5, an index is calculated based on outputs from step 0, step 4, and user settings for each diagnosis. At step 6, the diagnosis are ranked based on the indices and it is determined whether to trigger an alert. At step 7, an alert is output if warranted.

Figure 4:
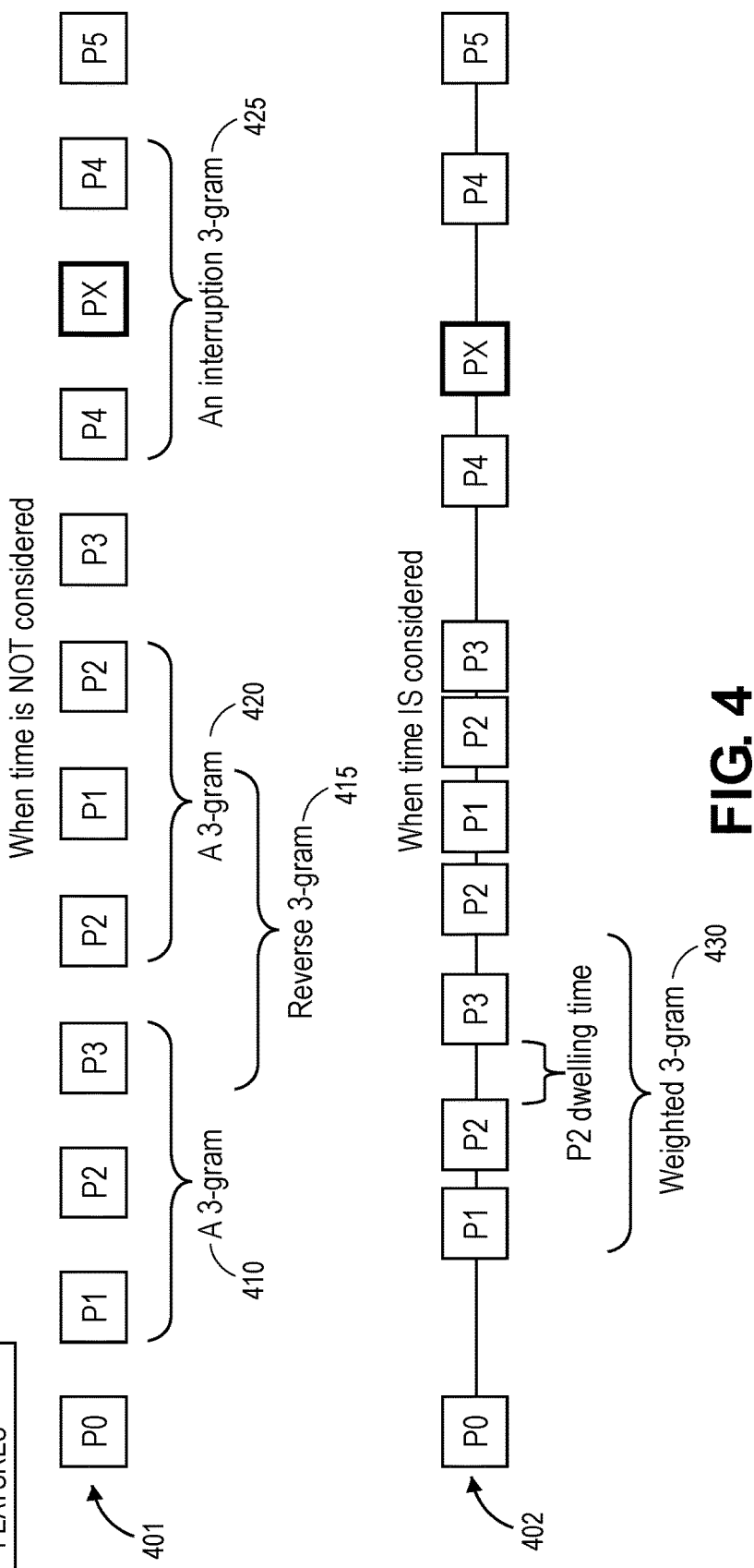
FIG. 4 shows examples of a processing step, including an example of when time is not considered, and an example of when time is considered.

FIG. 4 shows examples of a processing step, including an example 401 of when time is not considered, and an example 402 of when time is considered. With reference thereto, in the example 401, time is not considered. Each visited webpage {P0, P1, . . . , P5, PX} is detected and recorded by the webpage interaction processor 170. In this way, grams are constructed. For instance, FIG. 4 illustrates forward gram 410 comprising the webpage sequence P1, P2, P3. Further illustrated is forward gram 420 comprising the webpage sequence P2, P1, P2.

Gram 415 is a reverse gram comprising the webpage sequence P3, P2, P1. In some embodiments, a reverse gram is the reverse pattern of an n-gram. For example consider a website with four webpages ABCD. If a user clicked ABCBCD, the proposed system will identify the following 2-grams: AB, BC, CB, BC, CD. Since BC and CB are the reserve of each other, and BC appeared first in the sequence, CB is a reserve 2-gram. From a user experience perspective, reverse grams signify confusion. User click through data including many reserve grams demonstrates that a user is confused by the process that the website is trying to convey. Another aspect of reverse grams is "cycling" behavior, which is a repeated click pattern showing that a goal is not being reached by what is the apparent suggested path (e.g., affordance failure).

Gram 425 is an interruption gram comprising the sequence P4, PX, P4. In some embodiments, an interruption gram is a click pattern where the user deviates from the intended path. For example, a user filing an insurance claim deviated from filing the insurance claim to search the internet for five minutes, and then resumed the insurance claims process. This example behavior indicates that the user was not confident with the claims process right before they went to search the internet.

In example 402, where time is considered gram 430 is a weighted gram comprising the webpage sequence P1, P2, P3. In this regard, a weight based on time may be assigned to each of the individual webpages P1, P2, P3 within the gram; or, a weight based on time may be assigned to gram 430 as a whole.

Figure 5:
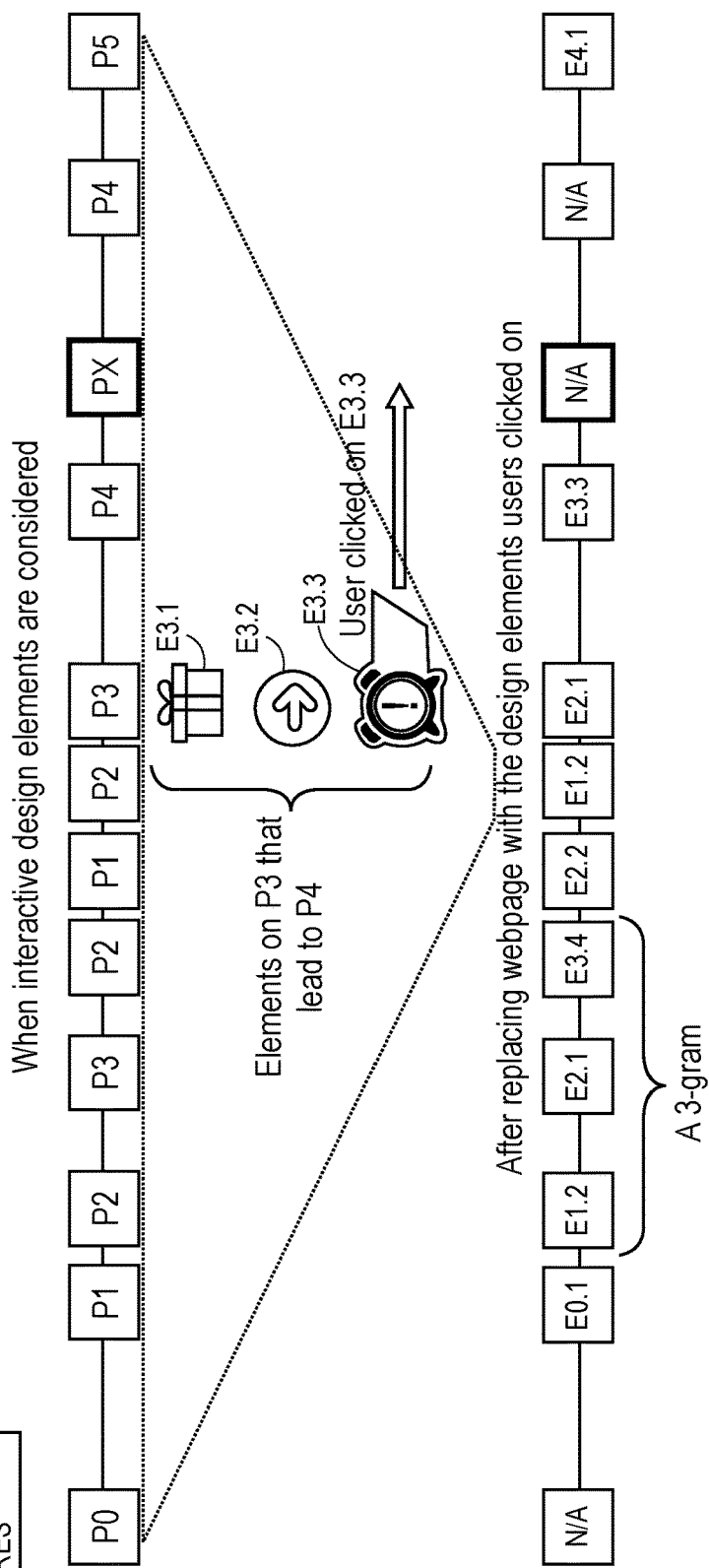
FIG. 5 shows an example of a processing step, including an example of how click behavior features are extracted.

FIG. 5 shows an example of a processing step, including an example of how click behavior features are extracted. With reference thereto, the individual elements (e.g., icons, hyperlinks, and so forth) on webpages that a user clicks on are recorded. For instance, elements E3.1, E3.2, and E3.3 are all on webpage P3 and lead to webpage P4. In this way, behavior elements may be extracted and analyzed.

Figure 6:
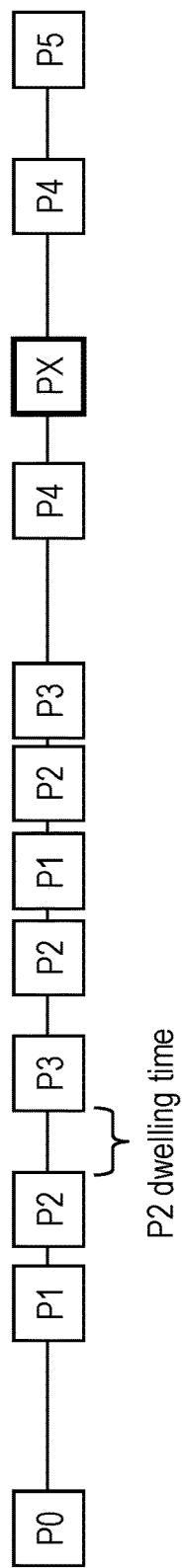
FIG. 6 shows an example of a processing step, including how click behavior initial weights are determined.

FIG. 6 shows an example of a processing step, including how click behavior initial weights are determined. In the example of FIG. 6, frequency weights and time weights are assigned to each webpage based on the gathered data.

Further, some embodiments train the analytics engine 180 using a machine learning algorithm, and accomplish techniques disclosed herein using the machine learning algorithm. The machine learning algorithm may be a supervised learning algorithm, employ decision trees, make use of an artificial neural network, make use of Bayesian statistical analysis, or combinations thereof. In this regard, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for diagnosing a problem of a website, the website comprising a plurality of webpages, and the method comprising, via one or more processors:
    receiving a list of potential user experience problems;
    extracting click data from the website;
    processing the extracted click data by processing the extracted click data into weighted grams, the weighted grams comprising a weight assigned to a gram as a whole based on a time derived from the click data;
    training an analytics engine based on the processed click data; and
    using the trained analytics engine to diagnose the problem of the website with a potential user experience problem of the received list of potential user experience problems.

2. The computer-implemented method of claim 1, wherein the list of potential user experience problems includes at least one of:
    difficulty in locating information relevant to a particular problem;
    difficulty in completing a process; and
    difficulty in noticing or accessing a button of the website.

3. The computer-implemented method of claim 1, wherein the processing the extracted click data comprises processing the extracted click data into at least one of:
    a forward gram;
    a reverse gram; and
    an interruption gram.

4. The computer-implemented method of claim 1, the weighted grams further comprising a weight based on a webpage frequency derived from the click data.

5. The computer-implemented method of claim 1, wherein:
    at least one webpage of the website comprises a plurality of elements configured to lead to another website of the webpage;
    the click data comprises click data of the plurality of elements; and
    processing the extracted click data comprises converting the click data into behavioral features.

6. The computer-implemented method of claim 1, wherein the analytics engine is trained via a machine learning algorithm.

7. The computer-implemented method of claim 1, further comprising:
- for at least one webpage of the plurality of webpages, calculating an index based on weight of diagnosis history; and
- determining to generate an output alert based on the index of the at least one webpage of the plurality of webpages.

8. The computer-implemented method of claim 1, further comprising:
- displaying, on a display, the diagnosed problem of the website.

9. The computer-implemented method of claim 1, further comprising:
- for at least one webpage of the plurality of webpages, calculating an index based on weight of diagnosis history; and
- outputting a visual alert based on the index of the at least one webpage of the plurality of webpages.

10. A system for diagnosing a problem of a website, the website comprising a plurality of webpages, and the system comprising one or more processors configured to:
- receive a list of potential user experience problems;
- extract click data from the website;
- process the extracted click data by processing the extracted click data into weighted grams, the weighted grams comprising a weight assigned to a gram as a whole based on a time derived from the click data;
- train an analytics engine based on the processed click data; and
- use the trained analytics engine to diagnose the problem of the website with a potential user experience problem of the received list of potential user experience problems.

11. The system of claim 10, wherein the list of potential user experience problems includes at least one of:
- difficulty in locating information relevant to a particular problem;
- difficulty in completing a process; and
- difficulty in noticing or accessing a button of the website.

12. The system of claim 10, the weighted grams further comprising a weight based on a webpage frequency derived from the click data.

13. The system of claim 10, further comprising a display configured to display the diagnosed problem of the website.

14. A computer-implemented method for diagnosing a problem of a website, the website comprising a plurality of webpages, and the method comprising, via one or more processors:
- with a webpage interaction processor, receiving a list of potential user experience problems;
- with the webpage interaction processor, extracting click data from the website;
- with the webpage interaction processor, processing the extracted click data by processing the extracted click data into weighted grams, the weighted grams comprising a weight assigned to a gram as a whole based on a time derived from the click data;
- training an analytics engine based on the processed click data; and
- with the trained analytics engine, diagnosing the problem of the website with a potential user experience problem of the received list of potential user experience problems.

15. The computer-implemented method of claim 14, wherein the list of potential user experience problems includes all of:
- difficulty in locating information relevant to a particular problem;
- difficulty in completing a process; and
- difficulty in noticing or accessing a button of the website.

16. The computer-implemented method of claim 14, the weighted grams further comprising a weight based on a webpage frequency derived from the click data.

17. The computer-implemented method of claim 14, further comprising:
- displaying, on a display, the diagnosed problem of the website.

* * * * *